United States Patent
Loebig

(10) Patent No.: US 12,258,903 B1
(45) Date of Patent: Mar. 25, 2025

(54) VORTEX TUBE PARTICLE SEPARATORS WITH COATINGS FOR REBOUND CONTROL

(71) Applicant: Rolls-Royce North American Technologies Inc., Indianapolis, IN (US)

(72) Inventor: James C. Loebig, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/371,812

(22) Filed: Sep. 22, 2023

(51) Int. Cl.
    *F02C 7/052* (2006.01)
    *B01D 45/16* (2006.01)
    *B04C 3/00* (2006.01)

(52) U.S. Cl.
    CPC .............. *F02C 7/052* (2013.01); *B01D 45/16* (2013.01); *B04C 3/00* (2013.01); *B04C 2003/003* (2013.01); *B04C 2003/006* (2013.01)

(58) Field of Classification Search
CPC .. F02C 7/05; F02C 7/052; F02C 7/055; B04C 5/185; B04C 5/187
See application file for complete search history.

(56) References Cited

U.S. PATENT DOCUMENTS

| | | |
|---|---|---|
| 3,362,155 A | 1/1968 | Edward |
| 3,421,296 A * | 1/1969 | Beurer, Sr. ............... F02C 7/052 55/306 |
| 4,268,287 A | 5/1981 | Norris |
| 4,289,611 A * | 9/1981 | Brockmann ............... B04C 3/06 209/710 |
| 4,976,748 A | 12/1990 | Prinsloo |
| 5,912,195 A * | 6/1999 | Walla ................... B29C 70/467 428/408 |
| 6,702,873 B2 | 3/2004 | Hartman |
| 7,678,165 B2 | 3/2010 | Tingle et al. |

(Continued)

FOREIGN PATENT DOCUMENTS

| | | |
|---|---|---|
| CN | 109519282 | 3/2019 |
| CN | 110617149 | 12/2019 |

OTHER PUBLICATIONS

Ashish, "Coefficient of Restitution", <https://www.scienceabc.com/pure-sciences/coefficient-of-restitution-definition-explanation-and-formula.html> (Year: 2017).*

*Primary Examiner* — Thuyhang N Nguyen
(74) *Attorney, Agent, or Firm* — Barnes & Thornburg LLP

(57) ABSTRACT

A vortex particle separator adapted for use with a gas turbine engine includes a vortex tube, a plurality of swirl vanes, and an outlet tube. The vortex tube receives atmospheric air laden with particles. The plurality of swirl vanes are arranged within the vortex tube and separate the atmospheric air into a first flow of air having the particles and a second flow of air that is relatively free of the particles. The outlet tube extends into the vortex tube to define a scavenge passageway between the outlet tube and the vortex tube that receives the first flow of air. The outlet tube defines an intake passageway that receives the second flow of air. The vortex particle separator further includes a layer of material having a low coefficient of restitution on at least one of an interior surface of the vortex tube and a surface of the swirl vanes.

19 Claims, 5 Drawing Sheets

(56) References Cited

U.S. PATENT DOCUMENTS

| | | | |
|---|---|---|---|
| 7,879,123 B2* | 2/2011 | Lundquist | B04C 3/06 |
| | | | 55/306 |
| 7,922,784 B2 | 4/2011 | Saeed et al. | |
| 7,927,408 B2 | 4/2011 | Sheoran et al. | |
| 8,657,903 B2* | 2/2014 | Menssen | F02M 35/0223 |
| | | | 55/504 |
| 8,945,254 B2 | 2/2015 | Mayer et al. | |
| 9,206,740 B2 | 12/2015 | Wong et al. | |
| 9,631,554 B2 | 4/2017 | Howe et al. | |
| 9,638,103 B2 | 5/2017 | Howe et al. | |
| 9,709,275 B2 | 7/2017 | De Diego et al. | |
| 10,227,924 B2 | 3/2019 | Snyder et al. | |
| 10,286,407 B2 | 5/2019 | Correia et al. | |
| 10,480,413 B2 | 11/2019 | Snyder | |
| 10,724,436 B2 | 7/2020 | Mayer et al. | |
| 10,738,699 B2 | 8/2020 | Burnside | |
| 10,947,901 B2 | 3/2021 | Darling et al. | |
| 11,073,083 B2 | 7/2021 | Snyder et al. | |
| 2006/0281861 A1* | 12/2006 | Putnam | C09D 183/04 |
| | | | 106/13 |
| 2012/0000168 A1* | 1/2012 | Chaudhari | B04C 3/06 |
| | | | 55/319 |
| 2013/0053174 A1* | 2/2013 | Shiga | A63B 37/0073 |
| | | | 473/371 |
| 2014/0144123 A1 | 5/2014 | Judd et al. | |
| 2015/0377040 A1 | 12/2015 | Roberge | |
| 2016/0177824 A1* | 6/2016 | Ponton | F02C 7/052 |
| | | | 60/39.092 |
| 2017/0211475 A1* | 7/2017 | Mayer | B01D 45/06 |

\* cited by examiner

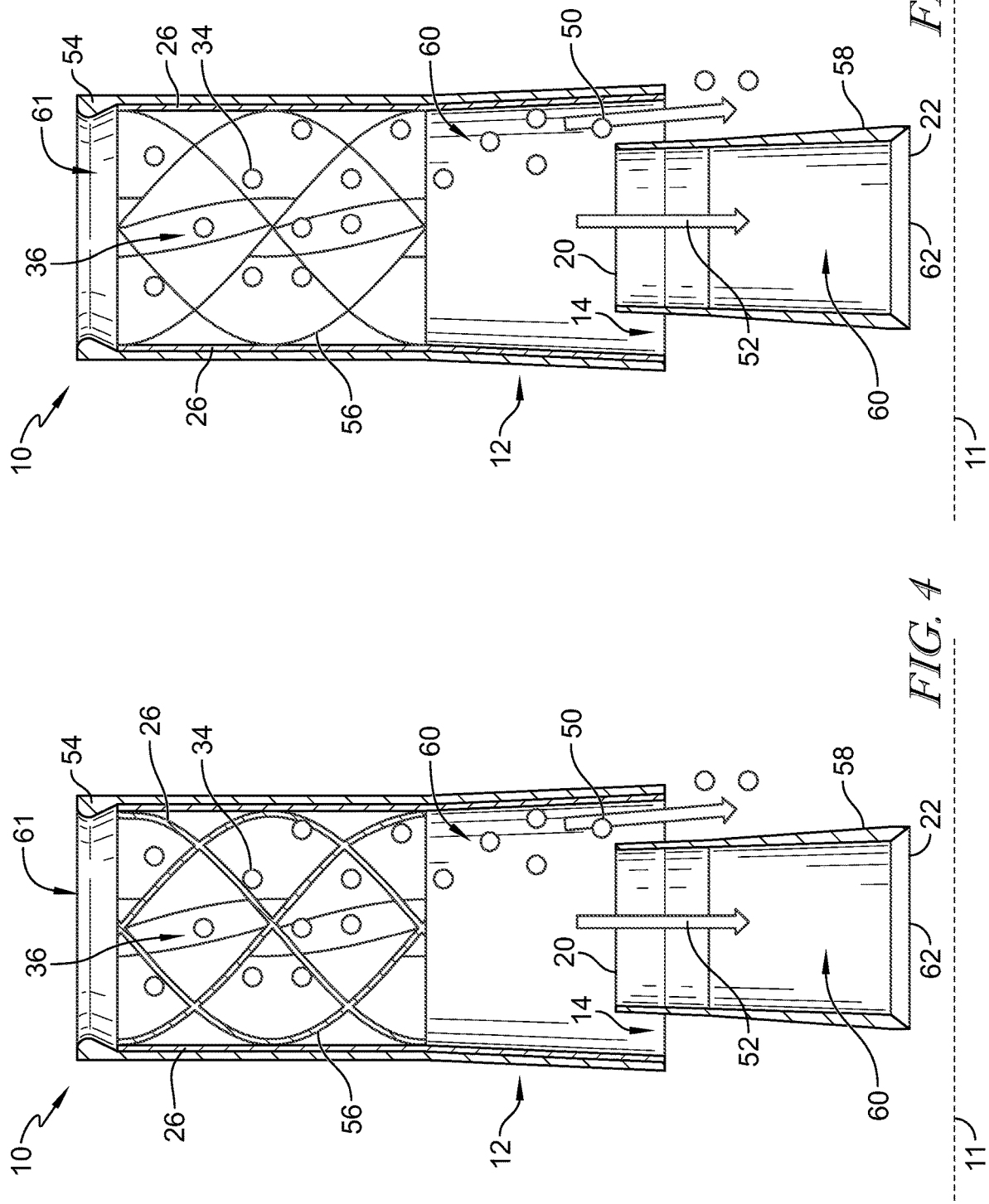

VORTEX TUBE PARTICLE SEPARATORS WITH COATINGS FOR REBOUND CONTROL

FIELD OF THE DISCLOSURE

The present disclosure relates generally to gas turbine engines, and more specifically to air-inlet ducts included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles such as dust, sand, ash, ice, salt spray, or liquid water may be entrained in the air and may be drawn into the air inlet and passed through the air-inlet duct to the compressor. Such particles may impact components of the compressor and turbine causing unintended wear. This unintended wear may decrease power output of the engine, decrease surge margin, shorten the life span of the engine, and lead to increased maintenance costs and increased down time of the engine. It remains an area of interest to reduce the number of particulates entering the compressor of gas turbine engines.

SUMMARY

The present disclosure may comprise one or more of the following features and combinations thereof.

According to an aspect of the present disclosure, an air-inlet duct assembly for a gas turbine engine includes a vortex particle separator, a scavenge duct, and an inlet duct. The vortex particle separator receives atmospheric air laden with particles and separates the atmospheric air laden with particles into a first flow of air having a majority of the particles and a second flow of air having a minority of the particles. The vortex particle separator includes a vortex tube, swirl vanes, and an outlet tube. The vortex tube is arranged circumferentially around an axis and configured to receive the atmospheric air therein. The swirl vanes are arranged within the vortex tube and configured to separate the atmospheric air laden with particles into the first flow of air and the second flow of air. The outlet tube extends into vortex tube and is spaced apart axially from the swirl vanes. The outlet tube and the vortex tube cooperate to define a scavenge passageway radially there between that receives the first flow of air. The outlet tube defines an intake passageway that receives the second flow of air.

The scavenge duct is in fluid communication with the scavenge passageway directs the first flow of air away from the gas turbine engine. The inlet duct is in fluid communication with the intake passage directs the second flow of air into a compressor of the gas turbine engine.

The vortex particle separator includes a layer of material on at least one of an interior surface of the vortex tube and a surface of the swirl vanes. The layer of material has a coefficient of restitution that is less than a coefficient of restitution of the at least one of the interior surface of the vortex tube and the surface of the swirl vanes to reduce a velocity of the particles that bounce off the at least one of the interior surface of the vortex tube and the surface of the swirl vanes to prevent the particles from bouncing into the intake passageway of the outlet tube.

In some embodiments, the coefficient of restitution of the layer of material is about 0.03 to about 0.15. In some embodiments, the layer of material has a thickness of about 0.001 inch to about 0.040 inch. In some embodiments, the layer of material is a tape, a film, a coating, or a combination thereof.

In some embodiments, the layer of material includes a silicone elastomer. In some embodiments, the layer of material further includes a silicone oil. In some embodiments, the layer of material includes a urethane, a polyurethane, a fluoroelastomer, or any combination thereof.

In some embodiments, each of the swirl vanes includes a pressure side and a suction side, and the layer of material is located only on the pressure side of each of the swirl vanes. In some embodiments, the layer of material is located only on the interior surface of the vortex tube that faces radially inward toward the swirl vanes.

According to another aspect of the present disclosure, a vortex particle separator includes a vortex tube, a plurality of swirl vanes, and an outlet tube. The vortex tube is arranged circumferentially around an axis and configured to receive atmospheric air laden with particles therein. The plurality of swirl vanes are arranged within the vortex tube and configured to separate the atmospheric air into a first flow of air having the particles entrained in the first flow of air and a second flow of air that is relatively free of the particles. The outlet tube extends into the vortex tube and cooperates with the vortex tube to define a scavenge passageway radially between the outlet tube and the vortex tube that receives the first flow of air. The outlet tube defines an intake passageway that receives the second flow of air.

The vortex particle separator further includes a layer of material on at least one of an interior surface of the vortex tube and a surface of the swirl vanes. The layer of material has a coefficient of restitution that is less than a coefficient of restitution of the at least one of the interior surface of the vortex tube and the surface of the swirl vanes to reduce a velocity of the particles that bounce off the at least one of the interior surface of the vortex tube and the surface of the swirl vanes to prevent the particles from bouncing into the intake passageway of the outlet tube.

In some embodiments, the coefficient of restitution of the layer of material is about 0.03 to about 0.15. In some embodiments, the layer of material has a thickness of about 0.001 inch to about 0.040 inch. In some embodiments, the layer of material is a tape, a film, a coating, or a combination thereof.

In some embodiments, the layer of material includes a silicone elastomer. In some embodiments, the layer of material further includes a silicone oil. In some embodiments, the layer of material includes a urethane, a polyurethane, a fluoroelastomer, or any combination thereof.

According to another aspect of the disclosure, a method of making a vortex particle separator includes a number of steps. The method includes providing a vortex tube, a plurality of swirl vanes, and an outlet tube formed to define an intake passageway, applying a layer of material having a coefficient of restitution that is less than a coefficient of restitution of at least one of an interior surface of the vortex tube and a surface of the swirl vanes to reduce a velocity of the particles that bounce off at least one of the interior surface of the vortex tube and the surface of the swirl vanes to prevent the particles from bouncing into the intake passageway of the outlet tube, coupling the plurality of swirl vanes with the vortex tube such that the vortex tube extends circumferentially around the plurality of swirl vanes, and inserting the outlet tube into the vortex tube such that the outlet tube and the vortex tube cooperate to define a scavenge passageway radially there between.

In some embodiments, the method further includes applying the layer of material to at least a portion of a pressure side of one of the plurality of swirl vanes. In some embodiments, the layer of material includes a silicone elastomer.

These and other features of the present disclosure will become more apparent from the following description of the illustrative embodiments.

BRIEF DESCRIPTION OF THE DRAWINGS

FIG. 4 is an enlarged view similar to FIG. 2A showing the layer of material applied to an interior surface of the vortex tube and a surface of the swirl vanes;

FIG. 5 is an enlarged view similar to FIG. 2A showing the layer of material applied only to an interior surface of the vortex tube.

DETAILED DESCRIPTION OF THE DRAWINGS

Figure 1:
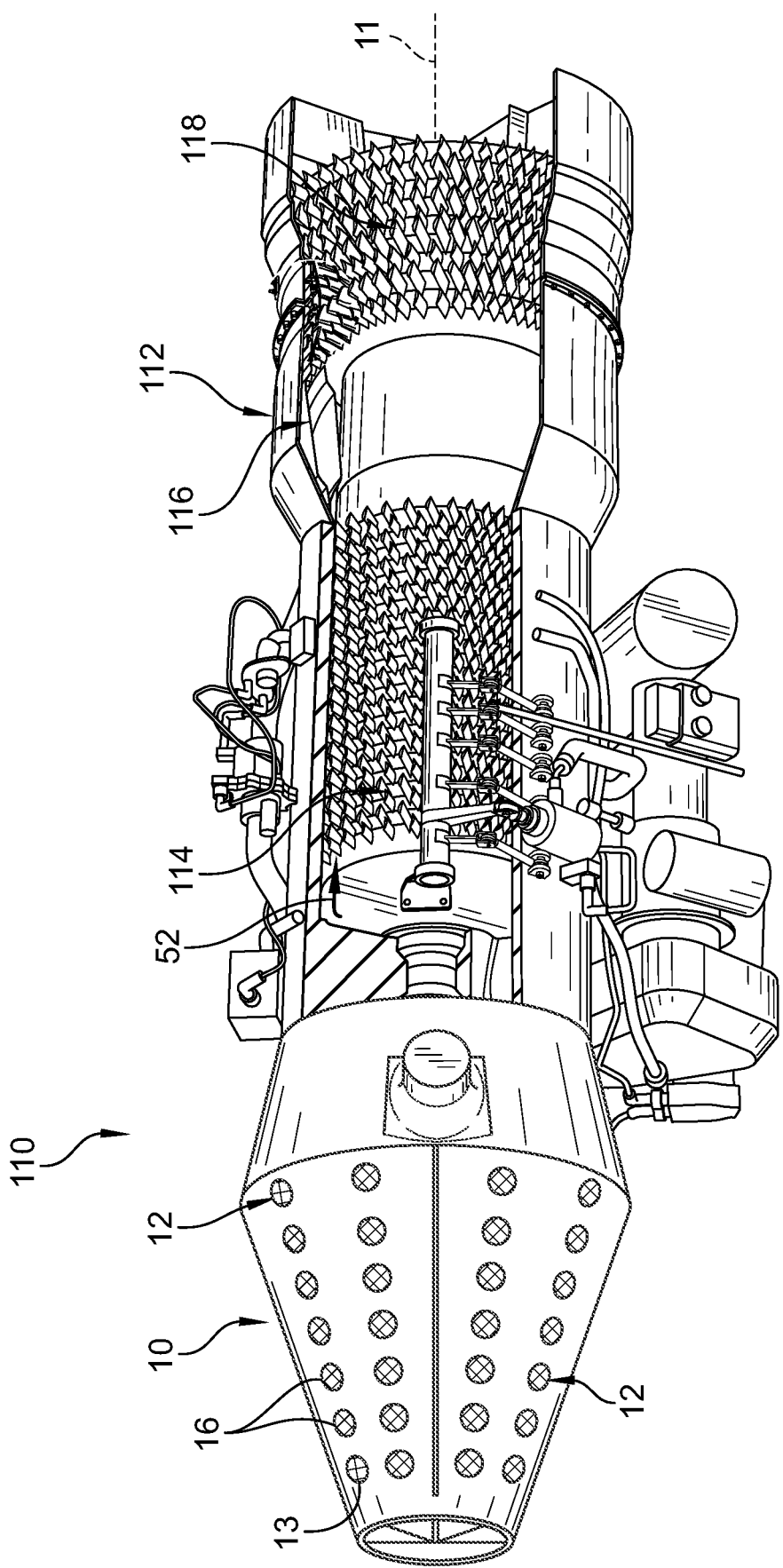
FIG. 1 is a cut-away perspective view of a gas turbine engine having a compressor, combustor, and turbine and showing that the gas turbine engine includes an air-inlet duct adapted to conduct air entering the gas turbine engine into the compressor included in the gas turbine engine, the air-inlet duct including a plurality of vortex particle separators configured to reduce a number of particles entering the compressor.

For the purposes of promoting an understanding of the principles of the disclosure, reference will now be made to a number of illustrative embodiments illustrated in the drawings and specific language will be used to describe the same.

A gas turbine engine 110 in accordance with the present disclosure is shown, for example, in FIG. 1. The gas turbine engine 110 includes an air-inlet duct 10 and an engine core 112. The engine core 112 includes a compressor 114, a combustor 116, and a turbine 118. Air 16 is drawn into the gas turbine engine 110 through the air-inlet duct 10 prior to admission of the air into the compressor 114 as suggested in FIGS. 1 and 2A. In some environments, particles such as dirt, sand, ash, ice, or liquid water may be entrained in the air 16 and carried into the gas turbine engine 110. The air-inlet duct 10 is configured to separate the particles from the air 16 to cause clean air 52, generally free from particles, to be delivered to the compressor 114 so that damage to the compressor 114 and the turbine 118 can be reduced and/or avoided.

The air-inlet duct 10 illustratively includes an outer shroud 13, a plurality of vortex particle separators 12, a scavenge duct 15, an inlet duct 17, and a layer of material 26 having a low coefficient of restitution as shown in FIGS. 2A, 2B, 4, and 5. In some embodiments, the plurality of vortex particle separators 12 extend radially into the outer shroud 13 relative to the axis 11. In other embodiments (not shown), the plurality of vortex particle separators 12 extend into the outer shroud 11 in any other orientation with respect to the axis 11. The vortex particle separators 12 are configured to receive atmospheric air 16 laden with particles 34 and to separate the atmospheric air 16 laden with particles into a first flow of air 50 having a majority of the particles 34 away from the compressor 114, while directing a second flow of air 52 having a minority of the particles 34, or in some embodiments, air generally free of particles, toward the compressor 114, thereby reducing the number of particles 34 that enter the compressor 114.

Figure 3:
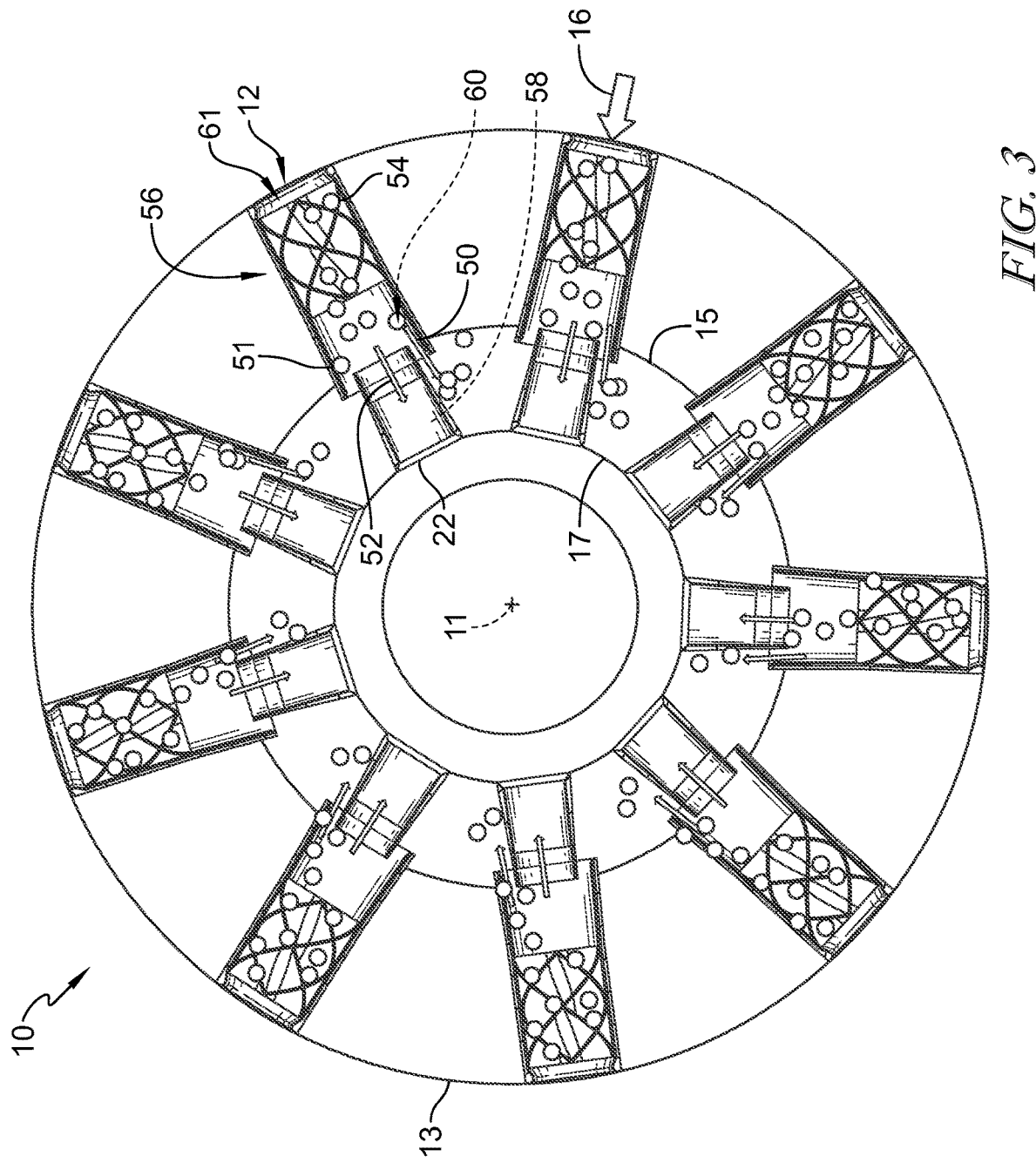
FIG. 3 is a diagrammatic front facing section view of the air-inlet duct of FIG. 1 through the central axis showing the plurality of vortex particle separators arranged circumferentially around the central axis and configured to receive the atmospheric air therein and suggesting that the particles are directed into a scavenge duct and clean air, free from particles, is directed into an inlet feeding the compressor.

In the illustrative embodiment, the plurality of vortex particle separators 12 are spaced apart axially from one another and circumferentially about the axis 11 as shown in FIGS. 1 and 3. In other embodiments, the plurality of vortex particle separators 12 are arranged only partway circumferentially about the axis, for example, if the gas turbine engine 110 is coupled to a side of an airframe. In some embodiments, a single vortex particle separator 12 may be used and may be arranged to extend along the axis 11.

Each vortex particle separator 12 of the illustrative embodiments includes a vortex tube 54 arranged circumferentially around an axis of the vortex particle separator and also the vortex tube 54 extends radially relative to the engine rotation axis 11. However, as disclosed above, such radial orientation is not required. The vortex tube 54 is configured to receive the atmospheric air 16 therein through an inlet 61 of the vortex tube 54. The particle separator 12 includes swirl vanes 56 arranged within the vortex tube 54. The particle separator 12 further includes an outlet tube 58 that extends into vortex tube 54 and is spaced apart axially from the swirl vanes 56 in the illustrative embodiment. The outlet tube 58 and the vortex tube 54 cooperate to define a scavenge passageway 14 radially therebetween that receives the first flow of air 50, and the outlet tube 58 defining an intake passageway 60 that receives the second flow of air 52 and directs it through the inlet duct 17 to the compressor 114.

Figure 2B:
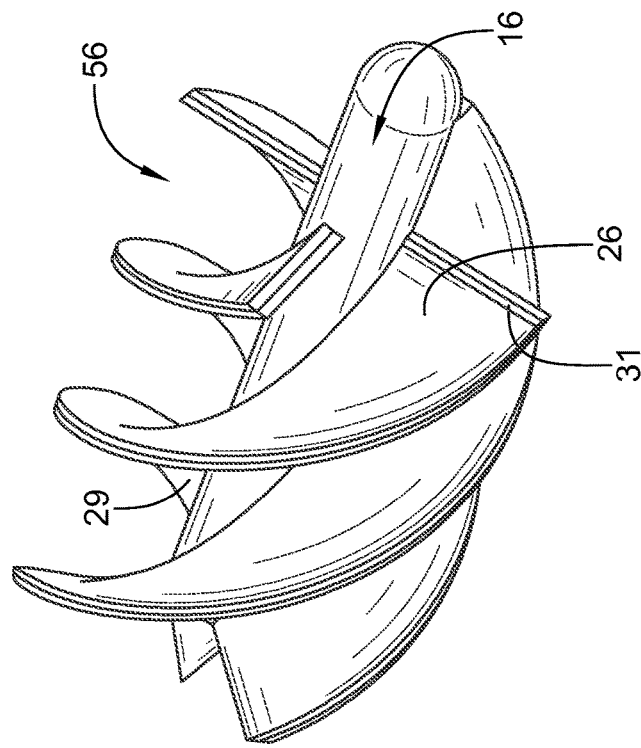
FIG. 2B is an enlarged perspective view of the swirl vanes of the vortex particle separator of FIG. 2A showing each of the swirl vanes includes a pressure side and a suction side, and the layer of material is located only on the pressure side of each of the swirl vanes.
Figure 2A:
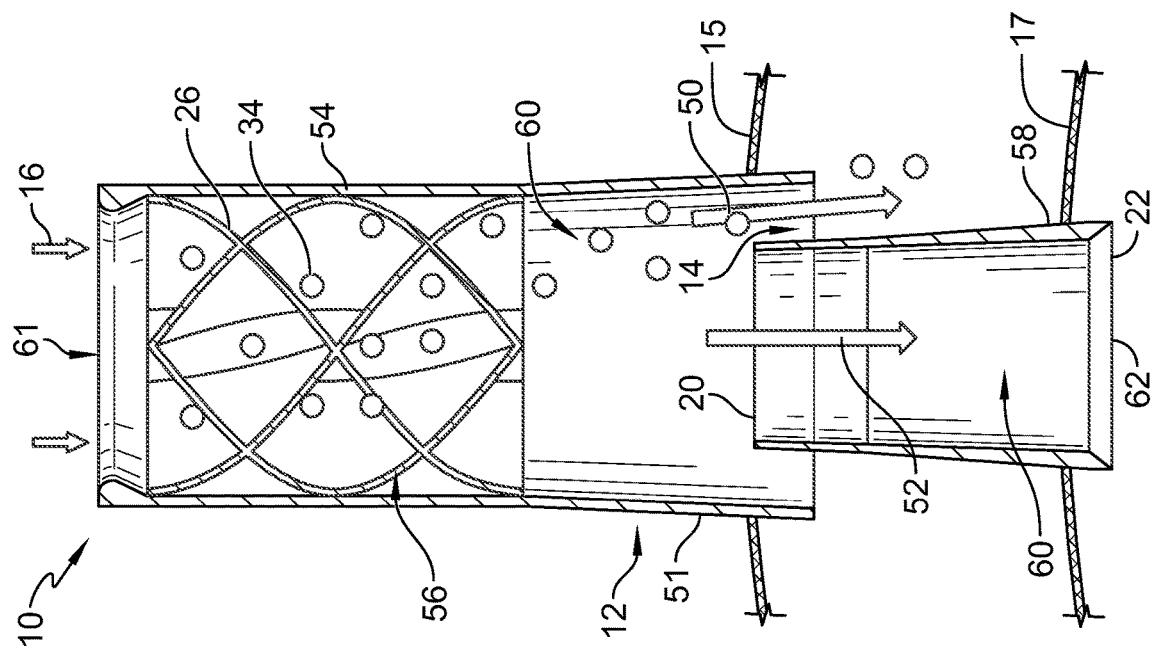
FIG. 2A is a diagrammatic section view of one of the vortex particle separators of the air-inlet duct of FIG. 1, the vortex particle separator being configured to receive atmospheric air laden with particles, the vortex particle separator including a vortex tube and swirl vanes, and an outlet, the vortex particle separator includes a layer of material on a surface of the swirl vanes, the layer of material has a coefficient of restitution that is less than a coefficient of restitution of the at least one of an interior surface of the vortex tube and the surface of the swirl vanes to reduce a velocity of the particles that bounce off the at least one of the interior surface of the vortex tube and the surface of the swirl vanes to prevent the particles from bouncing into the intake passageway of the outlet tube.

The outlet tube 58 includes an outer edge 20 and an inner edge 22, as shown in FIGS. 2A and 3. The outlet 62 of the vortex particle separator is defined by the inner edge 22 of the outlet tube 58. The outlet 62 directs the clean air 52 into the inlet duct 17. The outer edge 20 is located radially outward in spaced-apart relation to the engine rotation axis 11. The inner edge 22 is located radially between the outer edge 20 and the engine rotation axis 11. The inner edge 22 and the outer edge 20 cooperate to define the intake passageway 60 therebetween.

The vortex particle separator 12 is illustratively a particle separator shaped so that particles 34 entrained in the air 50 are carried by centrifugal force through the scavenge passageway 14 into the scavenge duct 15 while generally clean air 52 is conducted through the intake passageway 60 of the outlet tube 58 into the inlet duct 17 and directed to the compressor 114 as suggested in FIGS. 2A and 3.

The scavenge duct 15 is configured to conduct the air 50 with particles 34 away from the compressor 114 and typically discharges the air to ambient air. The scavenge duct 15 is in fluid communication with the scavenge passageway 14 and configured to direct the first flow of air 50 away from the gas turbine engine 110.

Figure 6:
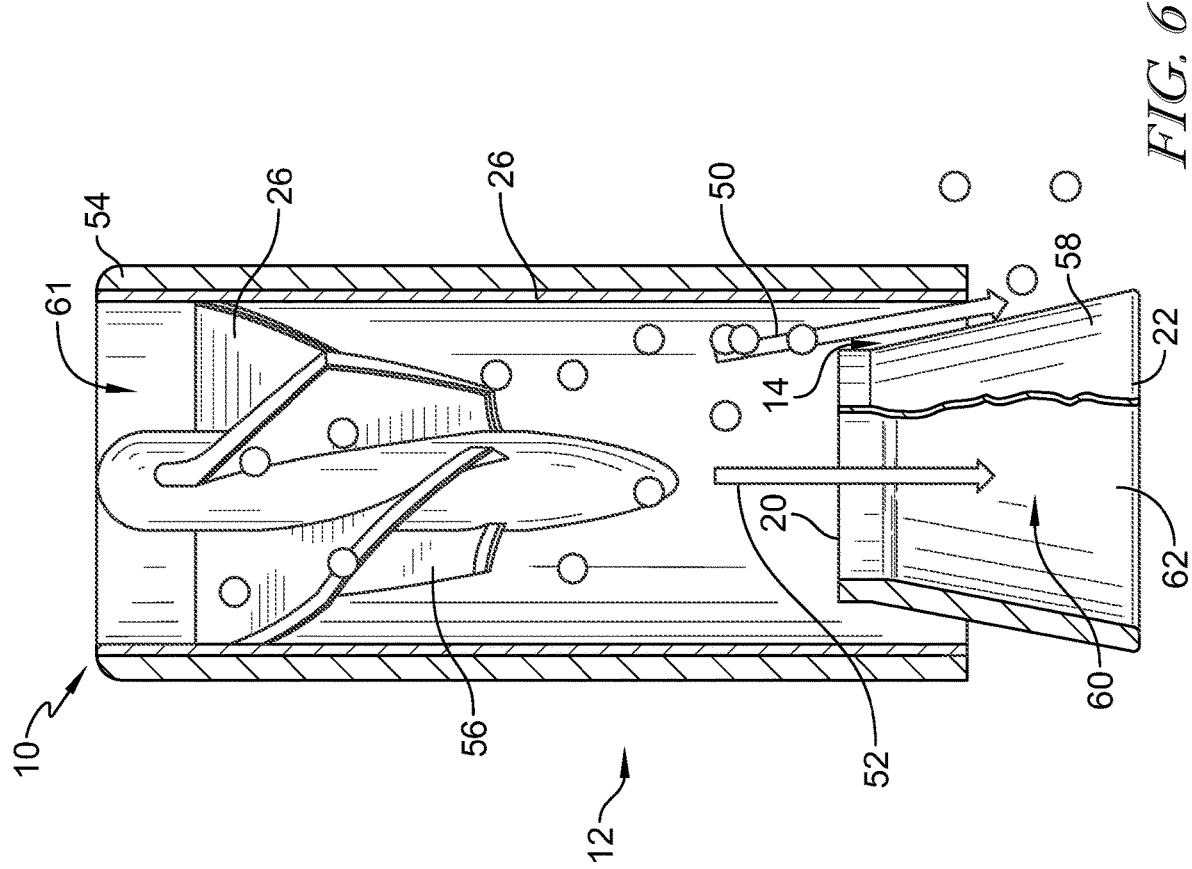
FIG. 6 is an enlarged view similar to FIG. 2A showing another vortex particle separator configured for use with the gas turbine engine of FIG. 1, the vortex particle separator including a vortex tube, swirl vanes, and an outlet, the vortex particle separator includes a layer of material applied to an interior surface of the vortex tube and a surface of the swirl vanes.

As shown in FIGS. 1 and 3, a plurality of vortex particle separators 12 are arranged together on a shared manifold to form a vortex particle separator array. The swirl vanes 56 are fixed relative to the vortex tube 54 to create a vortex in which centrifugal forces eject particles 34 toward the wall of the vortex tube 54 to separate the air laden with particles 34 and direct the first flow of air 50 into the scavenge passageway 14. The inlet duct 17 is in fluid communication with the intake passageway 60 and configured to direct the second flow of air 52 into the compressor 114 of the gas turbine engine 110. The entire edges of the swirl vanes 56 may extend to the vortex tube 54 as shown in FIG. 2A in some embodiments. The edges of the swirl vanes 56 contact the vortex tube 54 in FIGS. 2A, 4, and 5. In some embodiments, the edges of the swirl vanes 56 taper as the swirl vanes 56 extend toward the outlet tube 58 as shown in FIG. 6.

As shown in FIGS. 2A, 2B, 4, and 5, the vortex particle separator 12 includes a layer of material 26 on at least one of an interior surface of the vortex tube 54 and a surface of the swirl vanes 56. The layer of material 26 has a coefficient of restitution that is less than a coefficient of restitution of the at least one of the interior surface of the vortex tube 54 and the surface of the swirl vanes 56 to reduce a velocity of the particles 34 that bounce off the at least one of the interior surface of the vortex tube 54 and the surface of the swirl vanes 56 to prevent the particles from bouncing into the intake passageway 60 of the outlet tube 58. The layer of material 26 has a low coefficient of restitution, and as a result of being applied to discrete locations as described, the layer of material 26 reduces the number of particles 34 directed into the compressor 27. In some embodiments, no particles 34 are passed into the compressor 27.

In some embodiments, the layer of material 26 is applied to only a surface of the swirl vanes 56, as shown in FIG. 2A. As shown in FIG. 2B, the swirl vanes 56 have a pressure side 31 and a suction side 29, and the layer of material 26 is located only on the pressure side 31 of each of the swirl vanes 56 in the illustrative embodiment. In some embodiments, the layer of material 26 is located only on the interior surface of the vortex tube 54 that faces radially inward toward the swirl vanes 56, as shown in FIG. 5. In some embodiments, the layer of material 26 is located on both of the interior surface of the vortex tube 54 and the surface of the swirl vanes 56, as shown in FIGS. 4 and 6.

In some embodiments, the layer of material 26 is a tape, a film, a coating, or a combination thereof. The layer of material 26 is a coating in the illustrative embodiments. In other embodiments, the layer of material 26 is applied as a tape with an adhesive material. In some embodiments, the layer of material 26 has a thickness of between about 0.001 inches and 0.040 inches. In some embodiments, the layer of material 26 has a thickness of about 0.004 inches to about 0.020 inches. In some embodiments, the layer of material 26 has a thickness about or in any range between about 0.001, 0.002, 0.004, 0.006, 0.008, 0.010, 0.012, 0.014, 0.016, 0.018, 0.020, 0.022, 0.024, 0.026, 0.028, 0.030, 0.032, 0.034, 0.036, 0.038, and 0.040 inches.

The layer of material 26 has a coefficient of restitution that is less than a coefficient of restitution of at least one of an interior surface of the vortex tube 54 and the surface of the swirl vanes 56 to reduce a velocity of the particles 34 that bounce off the at least one of the interior surface of the vortex tube 54 and the surface of the swirl vanes 56 to prevent the particles from bouncing into the intake passageway 60 of the outlet tube 58 in some embodiments. The layer of material 26 has a coefficient of restitution that is less than a coefficient of restitution of the interior surface of the vortex tube 54 in some embodiments. In other embodiments, the layer of material 26 has a coefficient of restitution that is less than the swirl vanes 56. In some embodiments, the layer of material 26 has a coefficient of restitution that is less than a coefficient of restitution of each of the interior surface of the vortex tube 54 and the surface of the swirl vanes 56. In the illustrative embodiment, the vortex tube 54 and the swirl vanes 56 are made of plastic material, and the layer of material 26 has a coefficient of restitution that is less than the metallic material.

The layer of material 26 is arranged on a portion of the interior surface of the vortex tube 54 or arranged to cover the entire interior surface of the vortex tube 54. Similarly, the layer of material 26 is arranged on a portion of the surface of the swirl vanes 56 or arranged to cover the entire surface of the swirl vanes 56. The layer of material 26 is arranged in some embodiments to cover a portion of the pressure side 31 of the swirl vanes 56 or arranged to cover an entire surface of the pressure side 31 of the swirl vanes 56.

In some embodiments, the layer of material 26 includes at least one of a silicone elastomer and a silicone oil. In other embodiments, the layer of material 26 includes a silicone elastomer and a silicone oil. In one or more embodiments, the layer of material 26 includes a urethane, a polyurethane, a fluoroelastomer, or any combination thereof.

In some embodiments, the material used to form the layer of material 26 is formed by combining a silicone elastomer and a silicone oil. A solvent can be used for diluting the silicone elastomer, and the silicone oil can be added to the elastomer/solvent solution and infused into the silicone elastomer such that the coating can be self-replenishing. The solvent is not intended to be limited. In one or more embodiments, the solvent used is xylene. However, it is recognized that when a volatile solvent is used in the composition, and the composition is applied to form the layer of material 26, the solvent generally evaporates, leaving the silicone elastomer infused with silicone oil.

In one or more embodiments, the composition used to form the layer of material 26 further includes suspended nanoparticles. In some embodiments, the composition includes a silicone elastomer and suspended nanoparticles as a filler within the elastomeric matrix of the silicone elastomer. When the silicone oil is infused into the silicone elastomer, a combination of the infused silicone oil and the suspended nanoparticles can increase a strength and performance of the elastomeric matrix. In some embodiments, the silicone elastomer can include amorphous silicone dioxide in combination with a crystalline form of silicone dioxide, such as quartz nanocrystals. In some embodiments, the silicone elastomer can include oximino silane as a cross-linking agent and can be moisture activated. In some embodiments, the silicone elastomer includes one or more of quartz nanocrystals, cristobalite, or tridymite that can be suspended in the amorphous silicone dioxide. The quartz nanocrystals, cristobalite, or tridymite may provide strength to the elastomeric matrix of the silicone elastomer.

In some embodiments, the composition forming the layer of material 26 includes a silicone elastomer in an amount of about 43 to about 65 weight percent of the composition, a silicone oil ranging in an amount of about 2.5 to about 14.5 weight percent of the composition, and xylene in an amount of about 28 to about 50 weight percent of the composition. In other embodiments, the composition forming the layer of material 26 includes a silicone elastomer in an amount of about 43 to about 50 weight percent of the composition, a silicone oil in an amount of about 2.5 to about 14 weight percent of the composition, and xylene in an amount of about 43 to about 50 weight percent of the composition.

In one or more embodiments, the silicone elastomer used in the composition is a moisture-cured elastomer that can be cured in moisture infused ambient air, e.g., in less than 8 hours. In some embodiments, the silicone elastomer is cured in about 3 to about 5 hours in ambient air. The composition used to form the layer of material 26 as described is applied, in some embodiments, by one or more of drop casting, flow coating, spin coating, dip coating/immersion, and spraying.

In some embodiments, the coefficient of restitution of the layer of material 26 is less than about 0.15. In other embodiments, the coefficient of restitution of the layer of material 26 is about 0.03 to about 0.15. In some embodiments, the coefficient of restitution of the layer of material 26 is about 0.06 to about 0.10. In some embodiments, the layer of material 26 has a coefficient of restitution about or in any range between about 0.03, 0.04, 0.05, 0.06, 0.07, 0.08, 0.09, 0.10, 0.11, 0.12, 0.13, 0.14, and 0.15.

The layer of material 26 having the low coefficient of restitution will reduce a velocity of the particles 34 that bounce off the at least one of the interior surface of the vortex tube 54 and the surface of the swirl vanes 56 to prevent the particles 34 from bouncing into the intake passageway 60 of the outlet tube 58.

The scavenge duct 15 is located at an outlet of the scavenge passageway 14 as shown in FIG. 2A. The scavenge duct 15 includes a circumferentially extending wall that collects the particles from the scavenge passageway 14 and directs the air 50 and particles away from the compressor 27 and other engine components. The scavenge duct 15 extends around the primary flow path of the engine. The outlet of the scavenge duct 15 may include a blower to urge the air 50 and particles out of the scavenge duct 15 and into ambient air. Illustratively, the circumferentially extending wall is generally perpendicular to a direction of the scavenge passageway 14.

Conventional inlet particle separators (IPS) for aircraft may not perform with sufficient separation efficiency to fully reduce the engine damage accumulated by operating in austere environments. One cause of particle separation inefficiency in conventional particle separators is high rebound energy (coefficient of restitution, COR) of particles off of certain surfaces of the inlet particle separator. Metallic (e.g., Ti-6Al-4V, commercially pure Ti, and Al alloys) and composite (e.g., fiberglass with epoxy matrix) surfaces impacted by sand (e.g., quartz, feldspar, and other minerals) have coefficients of restitution that may be too high and therefore cause incoming sand to rebound into the compressor passageway 38 that delivers airflow into the compressor 27 and engine core 24. The vortex tube 54 and swirl vanes 56 may be made of such materials.

According to embodiments of the present disclosure, to prevent large ingestion into the compressor 114 and engine core 112, at least one of an interior surface of the vortex tube 54 and a surface of the swirl vanes 56 is coated with a layer of material 26 that has a low coefficient of restitution to prevent rebound out of scavenge passageway 14 or out of the scavenge duct 15 and into the compressor passageway 38.

In one or more embodiments, the layer of material 26 is an impact and/or erosion resistant material containing a silicone elastomer, or urethane or polyurethane with elastomeric properties that aid in energy absorption when impacted by particles having diameters about 4 micrometers to about 1000 micrometers. In some embodiments, the layer of material 26 is a silicone oil infused silicone elastomer coating. In other embodiments, the layer of material 26 reduces the amount of sand reaching the engine core 112 by more than 99% for some sand types including C-spec (Mil-E-5007). In some embodiments, applying the layer of material 26 to only interior surface of the vortex tube 54 significantly improves performance of the vortex particle separator 12.

In one or more embodiments, a method of making a vortex particle separator 12 includes providing a vortex tube 54, a plurality of swirl vanes 56, and an outlet tube 58 formed to define an intake passageway 60. The method further includes applying a layer of material 26 having a coefficient of restitution that is less than a coefficient of restitution of at least one of an interior surface of the vortex tube 54 and a surface of the swirl vanes 56 to reduce a velocity of the particles that bounce off the at least one of the interior surface of the vortex tube 54 and the surface of the swirl vanes 56 to prevent the particles from bouncing into the intake passageway 60 of the outlet tube 58. The method includes coupling the plurality of swirl vanes 56 with the vortex tube 54 such that the vortex tube 54 extends circumferentially around the plurality of swirl vanes 56, and inserting the outlet tube 58 into the vortex tube 54 such that the outlet tube 58 and the vortex tube 54 cooperate to define a scavenge passageway 14 radially therebetween.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct assembly for a gas turbine engine, the air-inlet duct assembly comprising:
a vortex particle separator configured to receive atmospheric air laden with particles and to separate the atmospheric air laden with particles into a first flow of air having a majority of the particles and a second flow of air having a minority of the particles, the vortex particle separator including a vortex tube arranged circumferentially around an axis and configured to receive the atmospheric air therein, swirl vanes arranged within the vortex tube and configured to separate the atmospheric air laden with particles into the first flow of air and the second flow of air, and an outlet tube that extends into the vortex tube and is spaced apart axially from the swirl vanes, the outlet tube and the vortex tube cooperate to define a scavenge passageway radially there between that receives the first flow of air, and the outlet tube defining an intake passageway that receives the second flow of air, a scavenge duct in fluid communication with the scavenge passageway and configured to direct the first flow of air away from the gas turbine engine, and an inlet duct in fluid communication with the intake passageway and configured to direct the second flow of air into a compressor of the gas turbine engine, wherein the vortex particle separator includes a layer of material on a surface of the swirl vanes, the layer of material has a coefficient of restitution that is less than a coefficient of restitution of the surface of the swirl vanes to reduce a velocity of the particles that bounce off the surface of the swirl vanes to prevent the particles from bouncing into the intake passageway of the outlet tube.

2. The air-inlet duct assembly of claim 1, wherein the coefficient of restitution of the layer of material is 0.03 to 0.15.

3. The air-inlet duct assembly of claim 1, wherein the layer of material includes a silicone elastomer.

4. The air-inlet duct assembly of claim 3, wherein the layer of material further includes a silicone oil.

5. The air-inlet duct assembly of claim 4, wherein the layer of material includes a urethane, a polyurethane, a fluoroelastomer, or any combination thereof.

6. The air-inlet duct assembly of claim 1, wherein the layer of material is a tape, a film, a coating, or a combination thereof.

7. The air-inlet duct assembly of claim 1, wherein the layer of material has a thickness of 0.001 inch to 0.040 inch.

8. The air-inlet duct assembly of claim 1, wherein each of the swirl vanes includes a pressure side and a suction side, and the layer of material is located only on the pressure side of each of the swirl vanes.

9. The air-inlet duct assembly of claim 1, wherein the layer of material is further located on an interior surface of the vortex tube that faces radially inward toward the swirl vanes.

10. The air-inlet duct assembly of claim 1, further comprising a second vortex particle separator circumferentially spaced apart from the vortex particle separator, the second vortex particle separator including a second vortex tube, second swirl vanes arranged within the second vortex tube, and a second outlet tube that extends into the second vortex tube.

11. A vortex particle separator adapted for use with a gas turbine engine, the vortex particle separator comprising:

a vortex tube arranged circumferentially around an axis and configured to receive atmospheric air laden with particles therein, a plurality of swirl vanes arranged within the vortex tube and configured to separate the atmospheric air into a first flow of air having the particles entrained in the first flow of air and a second flow of air that is relatively free of the particles, an outlet tube that extends into the vortex tube and cooperates with the vortex tube to define a scavenge passageway radially between the outlet tube and the vortex tube that receives the first flow of air, and the outlet tube defining an intake passageway that receives the second flow of air, and a layer of material on at least one of an interior surface of the vortex tube and a surface of the plurality of swirl vanes, the layer of material has a coefficient of restitution that is less than a coefficient of restitution of the at least one of the interior surface of the vortex tube and the surface of the plurality of swirl vanes to reduce a velocity of the particles that bounce off the at least one of the interior surface of the vortex tube and the surface of the plurality of swirl vanes to prevent the particles from bouncing into the intake passageway of the outlet tube, wherein the coefficient of restitution of the layer of material is 0.03 to 0.15.

12. The vortex particle separator of claim 11, wherein the layer of material includes a silicone elastomer.

13. The vortex particle separator of claim 12, wherein the layer of material further includes a silicone oil.

14. The vortex particle separator of claim 11, wherein the layer of material includes a urethane, a polyurethane, a fluoroelastomer, or any combination thereof.

15. The vortex particle separator of claim 11, wherein the layer of material is a tape, a film, a coating, or a combination thereof.

16. The vortex particle separator of claim 11, wherein the layer of material has a thickness of 0.001 inch to 0.040 inch.

17. A method of making a vortex particle separator, the method comprising:

providing a vortex tube, a plurality of swirl vanes, and an outlet tube formed to define an intake passageway, applying a layer of material having a coefficient of restitution that is less than a coefficient of restitution of at least one of an interior surface of the vortex tube and a surface of the plurality of swirl vanes to reduce a velocity of the particles that bounce off at least one of the interior surface of the vortex tube and the surface of the plurality of swirl vanes to prevent the particles from bouncing into the intake passageway of the outlet tube, coupling the plurality of swirl vanes with the vortex tube such that the vortex tube extends circumferentially around the plurality of swirl vanes, and inserting the outlet tube into the vortex tube such that the outlet tube and the vortex tube cooperate to define a scavenge passageway radially therebetween, wherein an outlet of the scavenge passageway is fluidly coupled with a scavenge duct such that the scavenge duct directs the particles away from the scavenge passageway, the scavenge duct being annular, wherein the coefficient of restitution of the layer of material is 0.03 to 0.15.

18. The method of claim 17, further comprising applying the layer of material to at least a portion of a pressure side of one of the plurality of swirl vanes.

19. The method of claim 17, wherein the layer of material includes a silicone elastomer.

* * * * *